(12) United States Patent
Asano et al.

(10) Patent No.: US 7,291,202 B2
(45) Date of Patent: Nov. 6, 2007

(54) PROCESS FOR MUTUAL SEPARATION OF PLATINUM GROUP METALS

(75) Inventors: Satoshi Asano, Niihama (JP); Shinichi Heguri, Niihama (JP); Yoshiaki Manabe, Niihama (JP); Masushi Kasai, Niihama (JP); Harumasa Kurokawa, Niihama (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 580 days.

(21) Appl. No.: 10/944,753

(22) Filed: Sep. 21, 2004

(65) Prior Publication Data

US 2005/0066774 A1    Mar. 31, 2005

(30) Foreign Application Priority Data

Sep. 26, 2003    (JP)    ............................. 2003-334797

(51) Int. Cl.
C22B 3/00    (2006.01)
C22B 11/00   (2006.01)

(52) U.S. Cl. .......................................... 75/741; 75/744

(58) Field of Classification Search ................ 75/744, 75/741

See application file for complete search history.

(56) References Cited

U.S. PATENT DOCUMENTS 3,876,747 A    4/1975    Pittie et al. .................... 423/22
4,390,366 A    6/1983    Lea et al. ................ 75/101 BE

FOREIGN PATENT DOCUMENTS

DE    197 46 134    3/1999
GB    2 395 446     5/2004
JP    3291203       5/1997
JP    9-203792      8/1997
JP    2001-98335    4/2001
JP    2001-516808   10/2001
WO    WO 99/13115   3/1999
WO    WO 03/093515  11/2003

OTHER PUBLICATIONS

British Patent Office Communication with Search Report for corresponding British Patent Application GB 0419796.8 dated Feb. 3, 2005.

Primary Examiner—Roy King
Assistant Examiner—Kathleen McNelis
(74) Attorney, Agent, or Firm—Edwards Angell Palmer & Dodge LLP

(57) ABSTRACT

A process for mutual separation of platinum group metals (PGM), wherein highly stable compounds and steps are used to efficiently remove impurity elements while preventing increase of impurity content relative to that of the PGM in the mother liquor and also preventing decomposition of a chloro complex, and palladium, platinum, iridium, ruthenium and rhodium are separated mutually in such a way that each of the separated PGM has a sufficient purity to be a commercial product.

A process for mutual separation of PGM, comprising the first step for leaching a raw material containing PGM and impurity elements, second step for removing the impurity elements from the leach liquor by solvent extraction, third step for recovering palladium from the raffinate, fourth step for removing cationic impurity elements from the raffinate by solvent extraction, fifth step for recovering platinum from the raffinate by hydrolysis, sixth step for recovering ruthenium from the precipitate by leaching, and seventh step for recovering iridium by solvent extraction to prepare the stripping liquor containing iridium and raffinate containing rhodium.

18 Claims, 2 Drawing Sheets

PROCESS FOR MUTUAL SEPARATION OF PLATINUM GROUP METALS

BACKGROUND OF THE INVENTION

1. Field of the Invention

The present invention relates to a process for mutual separation of platinum group metals (PGM), more particularly a process for mutual separation of PGM from a raw material which also contains impurity elements, wherein highly stable compounds and steps are used to efficiently remove the impurity elements while preventing increase of impurity content relative to that of the PGM in the mother liquor and also preventing decomposition of a chloro complex, and palladium, platinum, iridium, ruthenium and rhodium are separated in such a way that each of the separated PGM has a sufficient purity to be a commercial product.

2. Description of the Prior Art

PGM are scarce resources, and production of the natural minerals, e.g., platinum ores containing these metals at a high concentration, is limited. The raw materials for these metals produced on a commercial scale are mostly byproducts from refining of nonferrous metals, e.g., copper, nickel and cobalt, and various spent catalysts, e.g., those for treating automobile exhaust gases.

The byproducts from nonferrous metal refining contain PGM, e.g., platinum, palladium, iridium, rhodium, ruthenium and osmium present in the refining raw materials in trace quantities. They are concentrated, for their chemical properties, in the sulfide concentrates and the crude metals of the major metals, e.g., copper and nickel. They are separated in the form of precious metal concentrate containing these metals as the residue from a major metal recovery process, e.g., electrolysis.

The concentrate normally contains, in addition to copper and nickel as the major metals, other components, e.g., precious metals (e.g., gold and silver), 16 group elements (e.g., selenium and tellurium) and 15 group elements (e.g., arsenic), which are present at a higher concentration than PGM. Recovery of PGM follows recovery of gold and silver, which discharges a residue containing these metals together with impurity elements. The commercial process for separation/recovery of PGM from the above-described starting material containing them normally involves leaching in a solution and a subsequent separation process, e.g., solvent extraction or adsorption, by which they are separated mutually and refined.

Several processes by which PGM are separated mutually and refined have been proposed or implemented, and these processes and problems involved therein are described.

The processes for separation of individual PGM on a commercial scale from a raw material containing them may be represented by the one based on, e.g., the following steps (a) to (g) carried out in this order, with solvent extraction serving as the main separation technique:

(a) a raw material containing PGM is leached with aqua regia or chlorine to prepare an aqueous solution containing them, (b) the resulting aqueous solution is heated in the presence of nitric acid or the like as an oxidant, to distill off osmium, (c) the remaining solution is neutralized to a weakly acidic state, and heated in the presence of sodium hydrochlorate, chlorine or the like as an oxidant, to distill off ruthenium, (d) the remaining solution is treated to have a hydrochloric acid concentration increased to around 3 mols/L, and brought into contact with diethylene glycol dibutyl ether to selectively extract gold, (e) the resulting raffinate is brought into contact with a sparingly water-soluble alkyl sulfide to extract palladium, (f) the resulting raffinate is treated to reduce the iridium (IV) ion to iridium (III) ion, and brought into contact with tributyl phosphate to extract platinum, and (g) the resulting raffinate is treated to oxidize the iridium (III) ion to iridium (IV) ion, and brought into contact again with tributyl phosphate to extract iridium, leaving the rhodium in the raffinate.

These processes based on solvent extraction involve the following challenges to be overcome.

(1) Prevention of Increase of Impurity Content Relative to that of the PGM in the Mother Liquor These processes are based on the common concept of selectively separating gold and PGM while leaving other impurity elements in the mother liquor. As a result, impurity content relative to that of the PGM increases gradually as the process proceeds. For example, impurity elements are present frequently at an as high as 10 to 100 times higher content than rhodium and iridium totaled in the raffinate discharged from the rhodium/iridium separation step as the final stage of the process, making refining of these elements substantially difficult. Therefore, recovery of a PGM having a sufficient purity to be a commercial product needs a sophisticated process, number of required refining steps increasing as residual impurity element content increases, increasing loss of the PGM separated out together with impurity elements and hence decreasing the final yield.

In solvent extraction with diethylene glycol dibutyl ether as an extractant, for example, hydrochloric acid is normally kept at 3 mols/L or less in the aqueous phase, at which gold is selectively extracted but other impurity elements are little extracted and remain in the raffinate. In other words, impurity elements other than gold are separated insufficiently from PGM.

(2) Use of Highly Stable Compounds and Steps

Ruthenium separation by distillation produces ruthenium oxide (VIII) gas, which is highly explosive and reactive with an organic compound. Therefore, it needs a system of highly corrosion-resistant material, e.g., quartz glass, which tends to push up the investment.

Refining of the stripping liquor containing iridium discharged from the final step is normally based on reduction separation with mercury (I) chloride as a reductant for its high efficiency of separating iridium from the other coexisting PGM. It is however an environmentally problematical step.

(3) Prevention of Decomposition of a Chloro Complex of a PGM in the Mother Liquor Separation of ruthenium by distillation is frequently combined with solvent extraction. It is essential for this process to once neutralize the whole liquid, and, after the distillation step is completed, to increase concentration of free hydrochloric acid in the whole liquid. This should increase chemical consumption and, at the same time, capacity of the subsequent system because of the greatly increased liquid volume.

Each of the PGM is kept in the form of chloro complex, which is more suitable for solvent extraction than any other form and is resistant to hydrolysis resulting from changed pH level. However, the above process, involving neutralization and heating, tends to decompose the complex, and the decomposed product is difficult to be returned back to the original form even in the presence of newly added hydrochloric acid. This should decrease efficiency of separating the PGM by extraction.

For processes which use an adsorbent, on the other hand, various adsorbents and processes using them have been proposed. They may be represented by the following ones, each of which generally has one or more problems from a practical standpoint.

(1) Japanese Patent No. 3,291,203 (pages 1 and 2), for example, discloses a process which involves adsorption of a mixture of PGM in the form of aqueous solution on a chromatography medium, e.g., glycol methacrylate, and subsequent elution with an acidic solution for separating the individual elements. This process has practical problems resulting from very low adsorption capacity of the medium, which greatly increases the system capacity for recovering unit mass of each element. When 2 mL of a starting solution containing PGM at 0.3 g/L is to be treated, for example, a very large column, 10 mm in diameter and 300 mm in length, is required.

(2) JP-A-2001-98335 (pages 1 and 2), for example, discloses a process which involves adsorption of a mixture of PGM in the form of aqueous solution on an ethylene glycol/methacrylic acid copolymer, oligoethylene glycol or glycidyl methacrylate pentaerythritol-dimethacrylate copolymer, and subsequent elution with an elutant of hydrochloric acid containing an oxidant to separate rhodium and then with an elutant of hydrochloric acid containing a reductant to separate platinum and iridium. This process can achieve separation of iridium, whose adsorption characteristics notably change as it is oxidized or reduced, but has practical problems resulting from difficulty in separating other PGM mutually.

(3) JP-A-9-203792 (pages 1 and 2), for example, discloses a process which involves adsorption of a mixture of nitro complex anion of each PGM in the form of aqueous solution on an anion-exchange resin, and subsequent elution with thiourea, ammonia or the like to separate individual PGM stepwise. However, this process has practical problems resulting from difficulty in separating the PGM mutually to an extent that each of the separated elements has a sufficient purity to be a commercial product, because they are in the form of a nitro complex and similar to each other in chemical properties.

(4) JP-A-2001-516808 (pages 1 and 2), for example, discloses a process which involves extraction of a mixture of PGM in the form of aqueous solution with 4-methyl-2-pentanone to separate impurity elements, e.g., gold, tellurium and iron, passing the resulting solution over a medium mainly composed of a methacrylic acid ester gel, after it is adjusted at an oxidation-reduction potential of 500 mV or hydrochloric acid concentration of 5.5 to 6.5 mols/L, and subsequent elution with 6 mols/L hydrochloric acid to separate mixture of iridium, rhodium and ruthenium, palladium, platinum and osmium, in this order. This process, although individually separating palladium, platinum and osmium, has a problem of needing a separate step for separating iridium, rhodium and ruthenium from concomitantly separated copper, bismuth, lead and arsenic as major impurity elements, and another problem of greatly increased impurity element content relative to that of PGM after palladium and platinum as the major PGM are separated. Moreover, 4-methyl-2-pentanone as the extractant used in the first stage of this process is greatly lost in the process because of its very high solubility in water (19 g/L at 20° C.) and has safety-related problems resulting from its very low flash point of 17° C.

Under these circumstances, there have been demands for processes for mutual separation of PGM from a raw material which also contains impurity elements, wherein highly stable compounds (with respect to flash point and toxicity) and steps are used for solvent extraction of improved practicality to efficiently remove the impurity elements while preventing excessively increase of impurity content relative to that of the PGM in the mother liquor and also preventing decomposition of a chloro complex, and palladium, platinum, iridium, ruthenium and rhodium are separated mutually in such a way that each of the separated PGM has a sufficient purity to be a commercial product.

SUMMARY OF THE INVENTION

It is an object of the present invention to provide a process for mutual separation/recovery of PGM from a raw material which also contains impurity elements, wherein highly stable compounds and steps are used to efficiently remove the impurity elements while preventing increase of impurity content relative to that of the PGM in the mother liquor and also preventing decomposition of a chloro complex, and palladium, platinum, iridium, ruthenium and rhodium are separated mutually in such a way that each of the separated PGM has a sufficient purity to be a commercial product in consideration of the problems involved in the conventional techniques.

The inventors of the present invention have found, after having extensively studied mutual separation of PGM from a raw material which also contains impurity elements to achieve the above object, that the impurity elements are efficiently removed, and palladium, platinum, iridium, ruthenium and rhodium are separated mutually in such a way that each of the separated PGM has a sufficient purity to be a commercial product by a process comprising a series of steps of leaching to prepare the effluent containing the PGM, solvent extraction with a specific extractant to separate/remove the impurity elements, solvent extraction with a specific extractant to separate/recover palladium, solvent extraction with a specific extractant to separate/remove cationic impurity elements, hydrolysis to recover platinum by separating the precipitate containing iridium, ruthenium and rhodium, leaching the precipitate to separate/recover ruthenium, and solvent extraction with a specific extractant to separate iridium and rhodium mutually, achieving the present invention.

The first aspect of the present invention is a process for mutual separation of PGM from a raw material which also contains impurity elements, comprising the following steps:

(1) first step, wherein the raw material containing PGM is leached in the presence of an oxidant while being suspended in a hydrochloric acid solution to prepare the leach liquor containing the PGM, (2) second step, wherein the leach liquor prepared in the first step is separated by solvent extraction with diethylene glycol dibutyl ether into the organic phase containing the impurity elements and raffinate, (3) third step, wherein the raffinate prepared in the second step is treated by solvent extraction with an alkyl sulfide to extract palladium and the loaded solvent is then treated by stripping, to prepare the stripping liquor containing palladium and raffinate, (4) fourth step, wherein the raffinate prepared in the third step is separated by solvent extraction with bis(2-ethylhexyl)phosphoric acid into the organic phase containing cationic impurity elements and raffinate, (5) fifth step, wherein the raffinate prepared in the fourth step is hydrolyzed in the presence of an oxidant, after being adjusted at a pH of 5 to 12, to prepare the precipitate containing iridium, ruthenium and rhodium, and aqueous solution containing platinum, (6) sixth step, wherein the precipitate prepared in the fifth step is leached in the presence of an oxidant in a strongly alkaline aqueous solution kept at a pH of 12 or more, to prepare the residue containing iridium and rhodium, and leach liquor containing ruthenium, and (7) seventh step, wherein the residue prepared in the sixth step is dissolved in a hydrochloric acid solution to prepare the aqueous solution containing iridium and rhodium, the aqueous solution is treated by solvent extraction with tributyl phosphate to extract iridium, and the loaded solvent is then treated by stripping, to prepare the stripping liquor containing iridium and raffinate containing rhodium.

The second aspect of the present invention is the process of the first aspect for mutual separation of PGM, wherein the oxidant for the first step is at least one selected from the group consisting of nitric acid, hydrogen peroxide and chlorine.

The third aspect of the present invention is the process of the first aspect for mutual separation of PGM, wherein the leach liquor for the second step contains hydrochloric acid at 4 to 9 mols/L.

The fourth aspect of the present invention is the process of the first aspect for mutual separation of PGM, wherein each of the impurity elements in the organic phase of the second step is at least one selected from the group consisting of an element which can form a lipophilic chloro complex, trivalent arsenic, tetravalent selenium and tetravalent tellurium.

The fifth aspect of the present invention is the process of the first aspect for mutual separation of PGM, wherein the alkyl sulfide for the third step is selected from the group consisting of dihexyl and dioctyl sulfide.

The sixth aspect of the present invention is the process of the first aspect for mutual separation of PGM, wherein the raffinate prepared in the second step for the third step is adjusted at a pH of 0.5 to 2.5 before being treated with the alkyl sulfide.

The seventh aspect of the present invention is the process of the first aspect for mutual separation of PGM, wherein the fourth step is carried out at a pH of 2.5 to 4.5.

The eighth aspect of the present invention is the process of the seventh aspect for mutual separation of PGM, wherein an alkali metal salt of bis(2-ethylhexyl)phosphoric acid is used as a pH adjusting agent.

The ninth aspect of the present invention is the process of the first aspect for mutual separation of PGM, wherein the fifth step is carried out at a temperature of 60 to 100° C.

The tenth aspect of the present invention is the process of the first aspect for mutual separation of PGM, wherein the fifth step is carried out at an oxidation-reduction potential of 100 to 700 mV, determined using a silver/silver chloride reference electrode.

The 11$^{th}$ aspect of the present invention is the process of the first aspect for mutual separation of PGM, wherein the sixth step is carried out at an oxidation-reduction potential of 100 to 300 mV, determined using a silver/silver chloride reference electrode.

The 12$^{th}$ aspect of the present invention is the process of the first aspect for mutual separation of PGM, wherein the hydrochloric acid solution for the seventh step contains hydrochloric acid at 3 to 7 mols/L.

The 13$^{th}$ aspect of the present invention is the process of the first aspect for mutual separation of PGM, wherein the aqueous solution containing iridium and rhodium is kept at an oxidation-reduction potential of 700 to 1200 mV, determined using a silver/silver chloride reference electrode, for the solvent extraction in the seventh step.

The 14$^{th}$ aspect of the present invention is the process of the first aspect for mutual separation of PGM, wherein the aqueous solution for the stripping in the seventh step contains an alkali metal salt.

The 15$^{th}$ aspect of the present invention is the process of the first aspect for mutual separation of PGM, wherein a ruthenium refining step is further included to treat the leach liquor containing ruthenium from the sixth step in two stages, the reduction stage in the presence of a reductant to prepare the ruthenium-containing precipitate and crystallization stage to prepare the ruthenium compound crystal by dissolving the precipitate.

The 16$^{th}$ aspect of the present invention is the process of the 15$^{th}$ aspect for mutual separation of PGM, wherein the crystallization stage incorporates an aqueous solution of the ruthenium-containing precipitate dissolved in hydrochloric acid with potassium chloride or ammonium chloride to prepare the ruthenium compound crystal.

The 17$^{th}$ aspect of the present invention is the process of the first aspect for mutual separation of PGM, wherein an iridium refining step is further included to treat the stripping liquor from the seventh step in two stages, the reduction stage in the presence of metallic bismuth to prepare an alloy containing PGM other than iridium and aqueous solution containing iridium, and crystallization stage to prepare the iridium-containing crystal from the aqueous solution.

The 18$^{th}$ aspect of the present invention is the process of the 17$^{th}$ aspect for mutual separation of PGM, wherein the crystallization stage incorporates the iridium-containing aqueous solution, oxidized beforehand in the presence of an oxidant, with potassium chloride or ammonium chloride to prepare the iridium-containing crystal.

The process of the present invention for mutual separation of PGM from a raw material which also contains impurity elements can efficiently remove the impurity elements while preventing increase of impurity content relative to that of the PGM in the mother liquor and also preventing decomposition of a chloro complex of PGM, and separate palladium, platinum, iridium, ruthenium and rhodium mutually in such a way that each of the separated PGM has a sufficient purity to be a commercial product by use of a highly stable compounds and steps. As such, it is of very high industrial value.

NOTATION

Figure 1:
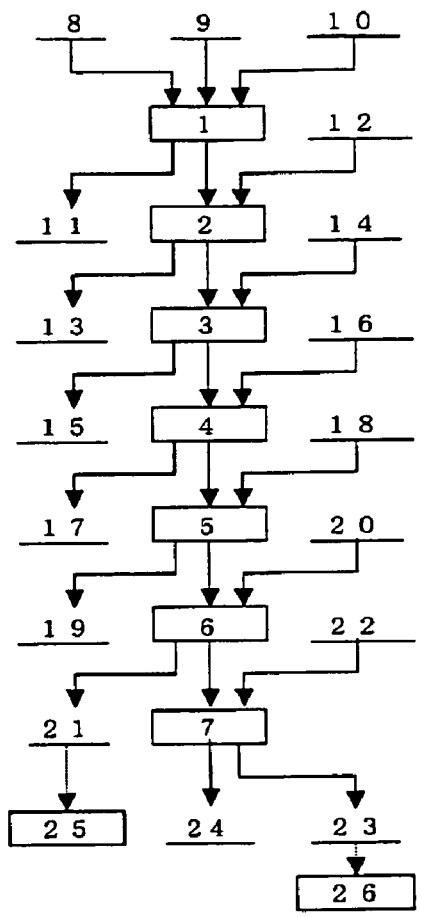
FIG. 1 illustrates one example of process flow of the process of the present invention for mutual separation of PGM.

1 First step (leaching of the raw material containing PGM)
2 Second step (solvent extraction to remove the impurity elements)

3 Third step (solvent extraction to extract palladium)
4 Fourth step (solvent extraction to remove cationic impurity elements)
5 Fifth step (hydrolysis of ruthenium, rhodium and iridium)
6 Sixth step (leaching of ruthenium)
7 Seventh step (solvent extraction to extract iridium)
8 Raw material containing PGM
9 Hydrochloric acid solution
10 Oxidant
11 Leach residue
12 Diethyleneglycol dibutyl ether
13 Organic phase containing impurity elements
14 Alkylsulfide
15 Stripping liquor containing palladium
16 Bis(2-ethylhexyl)phosphoric acid
17 Organic phase containing cationic impurity elements
18 Oxidant
19 Aqueous solution containing platinum
20 Oxidant
21 Leach liquor containing ruthenium
22 Tributyl phosphate
23 Stripping liquor containing iridium
24 Raffinate containing rhodium
25 Ruthenium refining step
26 Iridium refining step
27 Ruthenium reduction stage
28 Re-leaching
29 Re-reduction of ruthenium
30 Dissolution
31 Ruthenium crystallization
32 Ruthenium compound crystal
33 Iridium reduction stage
34 Iridium crystallization stage
35 Iridium recrystallization refining
36 Iridium-containing crystal
37 Alloy containing PGM other than iridium

DETAILED DESCRIPTION OF THE INVENTION

The process of the present invention for mutual separation of PGM is described in detail.

First, the process of the present invention is outlined by referring to FIG. 1, which illustrates one example of process flow for mutual separation of PGM from a raw material which also contains impurity elements.

Referring to FIG. 1, the raw material containing PGM 8 is treated in the first step (leaching of the raw material containing PGM) 1, wherein it is separated by leaching in the presence of the oxidant 10 while being suspended in the hydrochloric acid solution 9 into the leach liquor containing the PGM and leach residue 11. The leach liquor is separated in the second step (solvent extraction to remove the impurity elements) 2 with diethylene glycol dibutyl ether 12 as the extractant into the organic containing the impurity elements 13 and raffinate. The raffinate prepared in the second step is separated in the third step (solvent extraction to extract palladium) 3 with an alkyl sulfide 14 as the extractant, the loaded solvent being then treated by stripping, into the stripping liquor containing palladium 15 and raffinate.

The raffinate prepared in the third step is separated in the fourth step (solvent extraction to remove cationic impurity elements) 4 with bis(2-ethylhexyl)phosphoric acid 16 as the extractant into the organic phase containing cationic impurity elements 17 and raffinate. The raffinate prepared in the fourth step is treated in the fifth step (hydrolysis of ruthenium, rhodium and iridium) 5, where it is hydrolyzed in the presence of the oxidant 18, after being adjusted at a pH of 5 to 12, to prepare the precipitate containing iridium, ruthenium and rhodium, and aqueous solution containing platinum 19.

The precipitate prepared in the fifth step is separated in the sixth step (leaching of ruthenium) 6 by leaching in the presence of the oxidant 20 in a strongly alkaline aqueous solution kept at a pH of 12 or more, into the residue containing iridium and rhodium, and leach liquor containing ruthenium 21. The residue prepared in the sixth step is dissolved in a hydrochloric acid solution to prepare the aqueous solution containing iridium and rhodium, and separated in the seventh step (solvent extraction to extract iridium) 7, where the aqueous solution is treated with tributyl phosphate 22 to extract iridium, and the loaded solvent is then treated by stripping, into the stripping liquor containing iridium 23 and raffinate containing rhodium 24.

The leach liquor containing ruthenium 21 may be further treated in the ruthenium refining step 25, and so may be the stripping liquor 23 containing iridium in the iridium refining step 26.

(1) First Step (Leaching of the Raw Material Containing PGM)

The first step of the present invention leaches a raw material containing PGM and impurity elements in the presence of an oxidant while being suspended in a hydrochloric acid solution to prepare the leach liquor containing the PGM.

The raw material containing PGM and impurity elements to be treated by the process of the present invention is not limited. It may be a concentrate containing PGM and various impurity elements, produced from a byproduct from refining of nonferrous metals, e.g., copper, nickel and cobalt, or a spent catalyst of any type, e.g., that for treating automobile exhaust gases. The impurity elements include copper, nickel, cobalt and iron as the major metals, and other component elements, e.g., gold, silver, lead, tin, selenium, tellurium, arsenic, antimony and bismuth.

These PGM present in the raw material are normally metallic or in the form of sulfide, and can be dissolved in hydrochloric acid in the presence of an oxidant.

In this step, the material containing PGM is suspended in an aqueous solution containing hydrochloric acid, to which an oxidant is added. Hydrochloric acid may be added to the aqueous solution from the beginning, or, when the PGM is present in the form of sulfide, chemically produced by the reaction of chlorine with sulfide and water. In this step, most of lead and silver as impurity elements associated with the PGM normally remain in the residue in the form of chloride, while the others are dissolved in the form of chloride or chloro complex.

The oxidant for this step is not limited. It may be nitric acid, hydrogen peroxide, chlorate, chlorite, hypochlorite, chlorine, bromate, hypobromite, bromine and peroxosulfate. For practicality, however, it is preferably at least one selected from the group consisting of nitric acid, hydrogen peroxide and chlorine in consideration of cost.

The leaching condition for this step is not limited. However, the conditions under which a chloro complex is formed securely are selected. For example, temperature is preferably 70° C. or higher, and concentration of hydrochloric acid in the suspension is 4 mols/L or more. In other words, it is preferable to securely transform each of the PGM into a chloro complex in this leaching step under the above conditions, in order to prevent hydrolysis in the subsequent solvent extraction step with bis(2-ethylhexyl)phosphoric acid.

(2) Second Step (Solvent Extraction to Remove the Impurity Elements)

The second step of the present invention separates the leach liquor from the first step by solvent extraction with diethylene glycol dibutyl ether into the organic phase as the loaded solvent containing the impurity elements and raffinate. Of the impurity elements contained in the leach liquor, those which can form a lipophilic chloro complex, e.g., gold, tin, antimony, tellurium and iron, are mostly removed by this step. Moreover, trivalent arsenic and tetravalent selenium can be also extracted. As a result, this step can efficiently and concomitantly remove these impurity elements.

Concentration of hydrochloric acid in the leaching solution in this step is not limited, but preferably adjusted at 4 to 9 mols/L. At below 4 mols/L, extraction of the impurity elements other than gold is greatly retarded. At above 9 mols/L, on the other hand, diethylene glycol dibutyl ether is excessively eluted into the aqueous phase. Part of the PGM are slightly extracted into the organic phase. However, they can be stripped into the aqueous phase by scrubbing the organic phase with an aqueous hydrochloric acid solution of concentration in the above range.

The method for recovering the extracted impurity elements from the organic phase is not limited. A known method can be used for separating gold selectively by stripping with a reducing aqueous solution of oxalic acid, sodium sulfite or the like, and for separating/removing the other impurity elements from the organic phase in the form of precipitate of hydroxide or basic salt. Moreover, it is also possible to recover metallic gold selectively by stripping while separating the other impurity elements dissolved in the stripping liquor by keeping the stripping at a pH of −0.2 or less.

This process prevents increased content of the impurity elements relative to that of the PGM in the mother liquor, as one of the problems involved in the conventional solvent extraction process and to be solved by the present invention.

(3) Third Step (Solvent Extraction to Extract Palladium)

The third step of the present invention separates the raffinate prepared in the second step by solvent extraction with an alkyl sulfide to extract palladium, the loaded solvent being then treated by stripping, into the stripping liquor containing palladium and raffinate.

This process uses an alkyl sulfide as an extractant. The alkyl sulfide is not limited, but preferably dihexyl or dioctyl sulfide as a commercially available compound, the former being more preferable. When a similar, commercially available compound is used, it is necessary to scrutinize its selectivity with the impurity elements.

The alkyl sulfide is not limited, but is preferably diluted with a hydrocarbon-based diluent to have a concentration of 10 to 50% by volume. Extraction time is preferably 3 hours or more.

The raffinate prepared in the second step is not limited in pH level for the third step, but preferably adjusted at 0.5 to 2.5 before being brought into contact with the alkyl sulfide. This can prevent coextraction of the impurity elements, e.g., gold, selenium, antimony and tin when present in the raffinate, which may occur when a clad is formed in the extraction, scrubbing or stripping step in this solvent extraction step. At a pH level below 0.5, the effect of preventing the coextraction may be insufficient, tending to allow coextraction of these impurity elements concomitantly with palladium. At a pH level above 2.5, on the other hand, bismuth may be precipitated to cause coprecipitation of the PGM.

Moreover, tellurium, antimony and tin, when present at several tens mg/L or more in the raffinate from the second step, may be precipitated in this step. The precipitate, if generated, is preferably separated out beforehand for the subsequent step.

Adjusting pH level of the raffinate from the second step allows solubility of diethylene glycol dibutyl ether dissolved in the solution to decrease from 0.n~ng/L to 0.01 g/L as acid concentration decreases. This separates out the diethylene glycol dibutyl ether, which can be recovered by floatation.

In this step, the organic phase containing palladium is stripped with, e.g., ammonia water to prepare the stripping liquor containing palladium. It is preferable to scrub the organic phase with, e.g., 1 to 2 mols/L hydrochloric acid to separate/remove the coexisting impurity elements before being stripped. The organic phase regenerated by the stripping is reused for the extraction step.

Palladium having a sufficient purity to be a commercial product is recovered from the stripping liquor containing palladium by a known method. For example, crystal of diamminepalladium (II) chloride, at a purity of at least 99.9% by weight (as metal), can be obtained by neutralizing the stripping liquor with hydrochloric acid.

(4) Fourth Step (Solvent Extraction to Remove Anionic Impurity Elements)

The fourth step of the present invention separates the raffinate from the third step by solvent extraction with bis(2-ethylhexyl)phosphoric acid into the organic phase containing cationic impurity elements and raffinate. This step extracts/removes the cationic impurity elements, e.g., bismuth, copper, lead and nickel, which cannot be separated/removed in the second step.

This step uses bis(2-ethylhexyl)phosphoric acid as an extractant. Any acid extractant may be used in principle for this step. When it is less acidic (or having a higher pKa value) than bis(2-ethylhexyl)phosphoric acid, however, it is necessary to increase pH level for extraction of each metallic ion, which may cause hydrolysis and precipitation of bismuth. When it is more acidic (or having a lower pKa value), on the other hand, stripping may be difficult.

Bis(2-ethylhexyl)phosphoric acid solution is not limited, but is preferably diluted with a hydrocarbon-based diluent to have a concentration of 10 to 50% by volume.

The raffinate prepared in the third step is not limited in pH level for the fourth, but preferably adjusted at 2.5 to 4.5. At a pH level below 2.5, extraction of the impurity elements may be insufficient. At a pH level above 4.5, on the other hand, bismuth when present may be precipitated and tends to cause cladding.

The method for adjusting pH level for the fourth step is not limited. It is however preferable to use bis(2-ethylhexyl) phosphoric acid after it is partly converted into an alkali metal salt.

For example, the raffinate from the third step is preferably incorporated, while being mixed with bis(2-ethylhexyl) phosphoric acid, with its alkali metal salt as a pH adjusting agent. When an alkali instead of the alkali metal salt is used as a pH adjusting agent, bismuth, when present in the raffinate, may directly react with the alkali to produce a precipitate of oxychloride or the like. The extraction step involving the ion-exchange reaction between the alkali metal ion in the extractant and impurity element ion may prevent precipitation of a bismuth compound.

The method for treating the organic phase from this step is not limited, but it is preferably scrubbed with an aqueous solution containing a salt close to neutral, e.g., sodium chloride, before being treated by stripping. This allows physical recovery of the water droplets dispersed or suspended in the organic phase into the aqueous phase. In other words, the aqueous phase is physically dispersed or suspended in the organic phase, while a chloro complex of a PGM forming a anion ion is kept unextracted by bis(2-ethylhexyl)phosphoric acid.

The method for treating the scrubbed organic phase is not limited. It can be treated by stripping with a strongly acidic solution, e.g., hydrochloric acid, nitric acid or sulfamic acid, by a known method. When the organic phase contains bismuth or lead as an impurity, it is preferably stripped with a hydrochloric acid solution, because it can form a complex with this element to treat the organic phase efficiently at a low concentration. Concentration of the hydrochloric acid solution for the stripping is not limited, but preferably in a range from 0.5 to 2 mols/L. At below 0.5 mols/L, bismuth may be hydrolyzed to produce a precipitate. At above 2 mols/L, on the other hand, solubility of lead chloride may decrease due to the common ion effect to separate out. The organic phase regenerated by the stripping is reused for the extraction.

This step achieves prevention of increase of impurity content relative to that of the PGM in the mother liquor, as one of the problems involved in the conventional solvent extraction.

(5) Fifth Step (Hydrolysis of Ruthenium, Rhodium and Iridium)

The fifth step of the present invention treats the raffinate from the fourth step, where it is hydrolyzed in the presence of an oxidant, after being adjusted at a pH of 5 to 12, to prepare the precipitate containing iridium, ruthenium and rhodium, and aqueous solution containing platinum. This step selectively leaves platinum in the form of soluble alkali platinate in the aqueous solution while separating easily hydrolysable ruthenium, rhodium and iridium in the form of hydroxide precipitates.

The raffinate from the fourth step is adjusted at a pH of 5 to 12 for this step. At a pH below 5, hydrolysis of ruthenium, rhodium and iridium may be insufficient. At a pH above 12, on the other hand, the precipitated hydroxides of these elements may be redissolved. The pH adjusting agent for this step is not limited, and a water-soluble alkali is used. One of the preferable agents is sodium hydroxide.

Temperature for this step is not limited. Hydrolysis proceeds faster as temperature increases. It is particularly preferable 60 to 100° C. At below 60° C., hydrolysis may proceed insufficiently. At above 100° C., on the other hand, the system will need a pressure reactor.

Oxidation-reduction potential for this step is not limited, but preferably adjusted at 100 to 700 mV, determined using a silver/silver chloride reference electrode, more preferably 200 to 400 mV. The PGM are exposed to a strongly oxidic atmosphere in the first step, and ruthenium, rhodium and iridium are each transformed into a tetravalent chloro complex. However, they are gradually reduced thereafter by being mixed with various solvents, sometimes to the trivalent state before the fifth step. In order to completely precipitate ruthenium, rhodium and iridium, it is important to keep them each in the form of tetravalent hydroxide, which is low in solubility. At an oxidation-reduction potential below 100 mV, determined using a silver/silver chloride reference electrode, oxidation of the PGM is insufficient to produce ruthenium, rhodium and iridium hydroxides. At above 700 mV, on the other hand, the PGM may be partly oxidized into the hexavalent state to dissolve the hydroxides. Moreover, ruthenium may be oxidized even to the octavalent state to form $RuO_4$, which is known to be volatile and explosive.

The oxidant for this step is not limited. It may be chlorine, hypochlorite, chlorite, bromine, bromate, hypobromite or peroxosulfate, which works effectively in a neutral to alkaline region. Of these, sodium chlorite is more preferable, because it is easily stored, low in self-decomposition rate in the reaction process and low cost.

It is important for this step to increase yields of ruthenium, rhodium and iridium, which are contained at a lower content than platinum, in consideration of the overall process efficiency. Coprecipitation of platinum is inevitable, when this step is carried out under the conditions to completely precipitate ruthenium, rhodium and iridium. However, coprecipitated platinum can be separated in the form of aqueous solution in the subsequent ruthenium, rhodium and iridium refining steps, and totally recovered by further treating the aqueous solution by, e.g., reduction with hydrazine hydrate, described below.

Platinum can be recovered from the platinum-containing aqueous solution, which is separated from ruthenium, rhodium or iridium, by a known method in such a way to have a sufficient purity to be a commercial product. For example, the crystal of ammonium hexachloroplatinate (IV), at a purity of at least 99.9% by weight (as metal), can be produced when the aqueous solution is reduced with hydrazine hydrate, dissolved in hydrochloric acid in the presence of an oxidant, and incorporated with ammonium chloride.

(6) Sixth Step (Leaching of Ruthenium)

The sixth step of the present invention separates the precipitate from the fifth step by leaching in the presence of an oxidant in a strongly alkaline aqueous solution kept at a pH of 12 or more into the residue containing iridium and rhodium, and leach liquor containing ruthenium. This step oxidizes the precipitate in a strongly alkaline aqueous solution to leach out ruthenium in the form of sodium ruthenate (VI).

The strongly alkaline aqueous solution for this step is kept at a pH of 12 or more, preferably 13 or more. When sodium hydroxide is used for the above purpose, it is preferably in the form of at least 10% by weight aqueous solution. Sodium ruthenate (VI) is more stable in the solution of higher pH level. At a pH level below 12, sodium ruthenate (VI) is little produced. The pH adjusting agent for this step is not limited, and a water-soluble alkali is used. One of the preferable agents is sodium hydroxide.

Oxidation-reduction potential for this step is not limited, but preferably adjusted at 100 to 300 mV, determined using a silver/silver chloride reference electrode. At an oxidation-reduction potential below 100 mV, determined using a silver/silver chloride reference electrode, ruthenium (IV) hydroxide may be insufficiently oxidized into sodium ruthenate (VI). At above 300 mV, on the other hand, this step may be inefficient because of excessive self-oxidation of the oxidant.

The oxidant for this step is not limited. It may be chlorine, hypochlorite, chlorite, bromine, bromate, hypobromite or peroxosulfate, which works effectively in an alkaline region. Of these, sodium chlorite is more preferable, because it is easily stored, low in self-decomposition rate in the reaction process and low cost.

Slurry concentration of the suspension for this step is not limited, but preferably 100 g/L or less, more preferably 10 to 100 g/L. Leaching ratio increases as slurry concentration decreases. It can be normally 90% or more at a slurry concentration of 100 g/L or less.

In order to produce ruthenium of high purity, leaching ratio of ruthenium is intentionally kept low to control leaching of the PGM and impurity elements by controlling the conditions in this step, e.g., oxidation-reduction potential, pH and slurry concentration.

This step can separate/recover ruthenium without using distillation, unlike the conventional ruthenium separation process, and hence help realize the process for mutual separation of PGM with highly stable compounds.

(7) Seventh Step (Solvent Extraction to Extract Iridium)

The seventh step of the present invention separates the iridium and rhodium. The iridium- and rhodium-containing residue from the sixth step is dissolved in a hydrochloric acid solution, by solvent extraction with tributyl phosphate to extract iridium, the loaded solvent being then treated by stripping, into the stripping liquor containing iridium and raffinate containing rhodium.

Temperature at which the residue is dissolved in a hydrochloric acid solution is not limited. However, it is preferably 60 to 100° C. Iridium can be dissolved as hexachloroiridic (IV) acid when heated at a temperature in the above range.

Concentration of the hydrochloric acid solution dissolving the residue is not limited, but preferably 3 to 7 mols/L, at which iridium can be sufficiently extracted in the form of hexachloroiridic (IV) acid, more preferably 4 to 7 mols/L.

Oxidation-reduction potential of the aqueous solution containing iridium and rhodium for the above solvent extraction step is not limited, but preferably adjusted at 700 to 1200 mV, determined using a silver/silver chloride reference electrode, more preferably 800 to 1000 mV, in the presence of a oxidant. At below 700 mV, the hexachloroiridate (IV) ion is unstable, partly reduced to the trivalent iridium, and cannot be sufficiently extracted into the organic phase. On the other hand, increasing the potential beyond 1200 mV will no longer improve the extraction effect.

The oxidant for this step is not limited. It may be chlorine, chlorate, chlorite, hypochlorite, bromate, iodate or nitric acid, of which nitric acid is particularly preferable because it works as a catalyst for promoting formation of chloro complexes of PGM.

The aqueous solution, when containing ruthenium in addition to iridium and rhodium, is preferably incorporated with the nitrite ion, because it promotes formation of pentachloronitrosylruthenic acid (III) to separate ruthenium together with iridium into the organic phase and thereby to increase purity of rhodium in the aqueous phase.

The aqueous solution for stripping in this step of the organic phase containing iridium is not limited. It may be water or a diluted acid having a concentration of 1 mol/L or less. In particular, an aqueous solution of water-soluble alkali salt, e.g., sodium chloride, is preferable to prevent insufficient phase separation and hydrolysis of an impurity element in the organic phase.

Stripping in a reducing atmosphere in the presence of an aqueous solution containing hydrazine, its compound, sulfurous acid or sulfite is effective to more completely stripping iridium and other elements concomitantly present in the organic phase. It should be noted, however, the reducing agent suspended or dissolved in the organic phase may decrease oxidation-reduction potential of the solution during the extraction process. In such a case, it is necessary to keep the aqueous solution at an oxidation-reduction potential of 700 mV or more in the extraction stage.

Rhodium having a sufficient purity to be a commercial product is recovered by a known method from the rhodium-containing raffinate. For example, it is incorporated with sodium nitrite to prepare sodium hexanitrorhodate (III), which is dissolved in hot water to be refined by removing impurities, and then incorporated with ammonium chloride to separate/recover the ammonium hexanitrorhodate (III) crystal. It is at a purity of at least 99.9% by weight.

(8) Ruthenium Refining Step

The process of the present invention for mutual separation of PGM may include, as required, a ruthenium refining step which treats the leach liquor containing ruthenium from the sixth step. The ruthenium refining step comprises a reduction and crystallization stages, the former incorporating the leach liquor containing ruthenium with a reductant to prepare a ruthenium-containing precipitate, and the latter dissolving the precipitate to prepare the ruthenium compound crystal.

The method for the crystallization stage is not limited. However, the crystal is preferably prepared by incorporating potassium or ammonium chloride in an aqueous solution of the ruthenium-containing precipitate dissolved in hydrochloric acid. This step produces the ruthenium compound crystal having a sufficient purity to be a commercial product.

Figure 2:
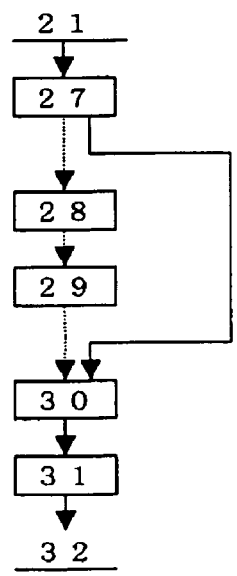
FIG. 2 illustrates one example of process flow of the ruthenium refining step.

FIG. 2 illustrates one example of process flow of the ruthenium refining step. Referring to FIG. 2, this step treats the leach liquor containing ruthenium 21 to prepare the ruthenium compound crystal 32 in 2 stages, the ruthenium reduction stage 27 and crystallization stage comprising the dissolution 30 of the precipitate prepared by the reduction and crystallization 31. Moreover, the precipitate prepared by the reduction may be further treated by the re-leaching 28 and re-reduction of ruthenium 29, as required.

In the reduction stage in this step, sodium ruthenate (VI) present in the leach liquor containing ruthenium is reduced in the presence of a reductant into ruthenium hydroxide (IV) in the form of precipitate. Platinum, when present as an impurity in the leach liquor, is mostly distributed in the mother liquor in this step to be separated from ruthenium. In order to separate platinum from the mother liquor more completely, it is preferable that the precipitate containing ruthenium (IV) hydroxide is leached out in the presence of an alkali, based on the method for the sixth step, and then reduced again to prepare the precipitate. Ruthenium (IV) hydroxide precipitates at an oxidation-reduction potential of around 0 mV, determined using a silver/silver chloride reference electrode.

The reductant for this step is not limited. It is preferably selected from mild reductants, e.g., alcohols, ketones and saccharides, which can selectively reduce ruthenium.

In the crystallization stage in this step, ruthenium (IV) hydroxide may be dissolved in hydrochloric acid in the form of hexachlororuthenic acid (IV) or its hydrated complex ion, and then incorporated with potassium or ammonium chloride to prepare the crystal of hexachlororuthenate (IV), oxopentachlororuthenate (IV) or oxotetrachlororuthenate (IV). Even when an impurity element other than platinum is present in trace quantities, it can be totally distributed in the mother liquor. This step can produce the ruthenium compound crystal, at a purity of at least 99.9% by weight (as metal).

In order to produce still purer ruthenium, this step may further recrystallize the crystal, as required, where the crystal may be reduced with a weak reductant, e.g., hydrazinium chloride or the sulfite ion, into ruthenium (III) chloride in the form of aqueous solution, which is oxidized again with an oxidant.

(9) Iridium Refining Step

The process of the present invention for mutual separation of PGM may further include, as required, an iridium refining step which treats the stripping liquor from the seventh step. The iridium refining step comprises a reduction and crystallization stages, the former reducing the stripping liquor with metallic bismuth to prepare an alloy containing PGM other than iridium and aqueous solution containing iridium, and the latter treating the aqueous solution to prepare the iridium-containing crystal.

The method for the crystallization stage is not limited. However, the crystal is preferably prepared by oxidizing indium in the aqueous solution with an oxidant and then incorporating potassium or ammonium chloride in the solution.

Figure 3:
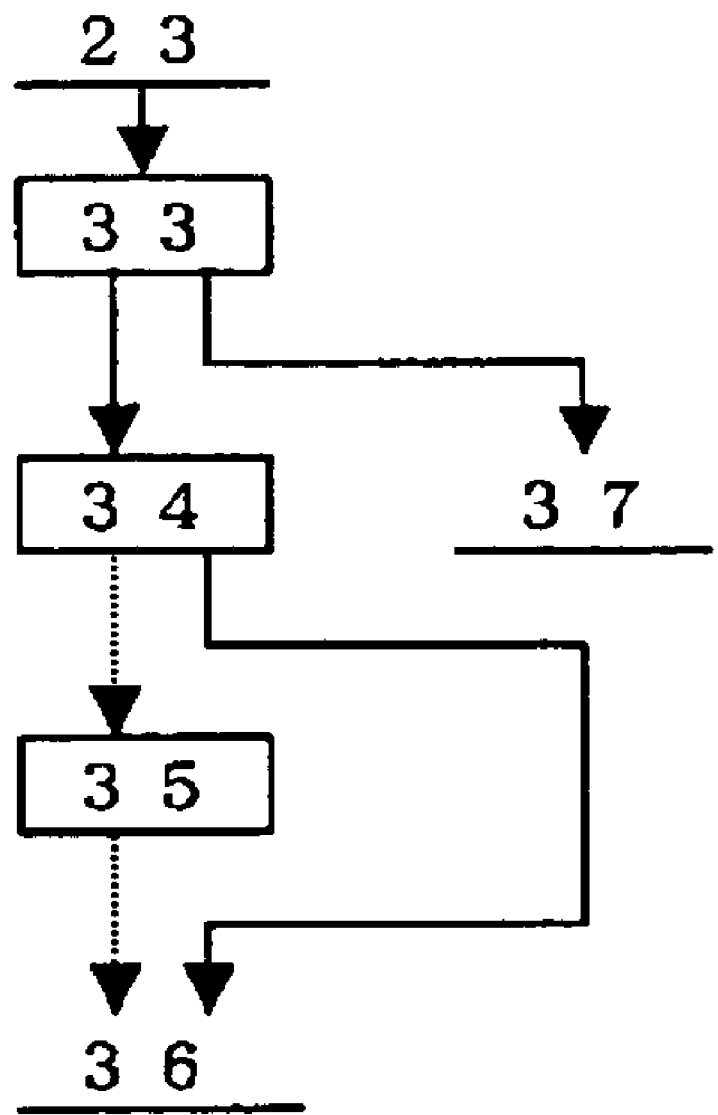
FIG. 3 illustrates one example of process flow of the iridium refining step.

FIG. 3 illustrates one example of process flow of the iridium refining step. Referring to FIG. 3, this step treats the stripping liquor containing iridium 23 to prepare the iridium-containing crystal 36 in 2 stages, the iridium reduction stage 33 and crystallization stage 34, the former stage preparing an alloy containing PGM other than iridium 37 and aqueous solution containing iridium, and the latter stage treating the aqueous solution. Moreover, the iridium recrystallization refining stage 35 may be adopted, as required.

The reductant for the reduction stage in this step is preferably metallic bismuth, because it can easily keep oxidation-reduction potential at around +300 mV, determined using a silver/silver chloride reference electrode, at which the iridium ion is not reduced but other PGM can be securely reduced. This allows production of an alloy containing PGM other than iridium and aqueous solution containing iridium.

In the crystallization stage in this step, an aqueous solution containing iridium is incorporated again with an oxidant to be kept at an oxidation-reduction potential of 700 to 1000 mV, determined using a silver/silver chloride reference electrode, preferably 800 to 100 mV. This stably produces the hexachloroiridate (IV) ion, which is needed for forming the crystal. At below 700 mV, the hexachloroiridate (IV) ion is unstable, partly reduced to the trivalent state. At above 1000 mV, on the other hand, lead may be transformed into the tetravalent state, although to only a limited extent, forming the hexachloroplumbate (IV) to contaminate the isomorphous iridium-containing crystal.

The oxidant for the crystallization stage is not limited. It may be chlorine, chlorate, chlorite, hypochlorite, bromate, iodate or nitric acid.

In the crystallization stage, the aqueous solution adjusted at a desired oxidation-reduction potential is then incorporated with potassium or ammonium chloride. This can selectively crystallize iridium, to produce the hexachloroiridate crystal, at a purity of at least 99.9% by weight (as metal).

In order to produce still purer iridium compound, this step may further recrystallize the crystal, as required, where the crystal may be reduced with a weak reductant, e.g., hydrazinium chloride or the sulfite ion, into iridium (III) chloride in the form of aqueous solution, which is oxidized again with an oxidant. When the ammonia hexachloroiridate (IV) crystal is further refined by recrystallization, oxidation/decomposition may be adopted with a strong oxidant, e.g., aqua regia, to oxidize the ammonium ion to nitrogen and makes it soluble. Moreover, the isomorphous hexachloroplumbate (IV) crystal may be formed to contaminate the product crystal. However, it can be easily separated, when the purer iridium compound is recrystallized while the crystal slurry concentration is kept at 100 g/L or less.

The solvent used for each solvent extraction step for the present invention has a flash point of 70° C. or higher. The diluent for the present invention may be selected from commercially available hydrocarbons, e.g., alkyl benzenes, alkyl naphthalenes, alkyl cyclohexanes and so on having a flash point of 70° C. or higher.

As discussed above, the process of the present invention for mutual separation of PGM realizes use of highly stable compounds and steps, as the problem to be solved for the conventional techniques employing solvent extraction.

EXAMPLE

The present invention is described in more detail by EXAMPLE, which by no means limits the present invention. Metals were analyzed by ICP-AES in EXAMPLE.

Example 1

A PGM concentrate as a raw material was treated a series of steps; leaching of the material containing PGM (first step), solvent extraction to remove the impurity elements (second step), solvent extraction to extract palladium (third step), solvent extraction to remove cationic impurity elements (fourth step), hydrolysis of ruthenium, rhodium and iridium (fifth step), leaching of ruthenium (sixth step) and refining of ruthenium, and solvent extraction to extract iridium (seventh step) and refining of iridium. The products from these steps were evaluated. Table 1 gives the chemical composition of the PGM concentrate as the raw material. Part of each PGM was in the form of sulfide.

TABLE 1

| Pt | Pd | Rh | Ir | Ru | Cu | Se | Pb | Bi | Sb | Te | Sn | Au |
|---|---|---|---|---|---|---|---|---|---|---|---|---|
| 0.95 | 3.82 | 0.20 | 0.03 | 0.41 | 0.17 | 0.08 | 15.2 | 13.7 | 0.04 | 0.13 | 0.01 | 1.45 |

(Unit: % by weight (wet basis))

(1) First Step

The above-described PGM concentrate was leached with chlorine, where 60 kg of the concentrate was suspended in 200 L of water, and the resulting suspension was sealed with chlorine after it was heated to 80° C., and kept for 3 hours at a maximum attainable oxidation-reduction potential (determined using a silver/silver chloride reference electrode, hereinafter sometimes referred to as ORP) of 1050 mV. The resulting leach liquor became a 5 mols/L hydrochloric acid solution as sulfur in the starting concentrate reacted with chlorine. The leaching-treated suspension was separated by filtration into the leach liquor and residue, which was washed with 30 L of water, producing 280 L of the leach liquor (including the wash water) and 13.5 kg of the residue (moisture content: 4.2% by weight). The residue was dried. Table 2 gives the chemical composition of each product.

TABLE 2

| | Unit | Pt | Pd | Rh | Ir | Ru | Cu | Se | Pb | Bi | Sb | Te | Sn | Au |
|---|---|---|---|---|---|---|---|---|---|---|---|---|---|---|
| leach liquor | g/L | 2.01 | 8.11 | 0.43 | 0.058 | 0.88 | 0.4 | 0.16 | 3.41 | 29.4 | 0.039 | 0.27 | 0.01 | 2.95 |
| residue | % by weight | 0.04 | 0.143 | 0.01 | 0.003 | 0.018 | 0.006 | 0.006 | 63.5 | <0.1 | <0.1 | <0.005 | <0.005 | 0.32 |

(2) Second Step

The leach liquor prepared in the first step was treated by solvent extraction to remove the impurity elements using a multi-stage, counter-current mixer/settler, with diethylene glycol dibutyl ether (DBC) as an extractant. The extraction was carried out in 2 stages for extraction, and 3 stages for scrubbing with a 5 mols/L hydrochloric acid solution, where the leach liquor/DBC/scrubbing hydrochloric acid solution ratio was set at 1/0.25/0.25. The wash solution discharged from the scrubbing stage was combined with the stream flowing into the first extraction stage. Mixing time and phase separation time were set at 10 and 20 minutes, respectively, for each of the extraction and scrubbing stages. The extraction separated the leach liquor into 350 L of the raffinate and 87.5 L of the extracted organic phase. Each product was analyzed for its chemical composition. The results are given in Table 3.

TABLE 3

| Products by extraction with DBC | Pt | Pd | Rh | Ir | Ru | Cu | Se | Pb | Bi | Sb | Te | Sn | Au |
|---|---|---|---|---|---|---|---|---|---|---|---|---|---|
| Organic phase | 0.057 | 0.013 | 0.015 | 0.001 | 0.059 | 0.000 | 0.001 | 0.002 | 0.004 | 0.125 | 0.845 | 0.027 | 9.421 |
| Raffinate | 1.59 | 6.49 | 0.34 | 0.046 | 0.69 | 0.30 | 0.13 | 2.73 | 23.5 | <0.001 | 0.005 | <0.001 | 0.005 |

(Unit: g/L)

the solution with 117 L of water to prepare 700 L of the aqueous solution. The resulting aqueous solution was treated as the starting solution by solvent extraction to separate palladium, where the extractant was dihexyl sulfide (Daihachi Chemical Industry, SFI-6R) diluted with EM Clean 7250 (Nikko Petrochemicals) to 20% by volume. The extraction was carried out in 1 stage using a mixer/settler, where extraction time was set at 3 hours. The organic phase was scrubbed with a 0.5 mols/L aqueous hydrochloric acid solution. The starting solution/SFI-6R solution/scrubbing hydrochloric acid solution ratio was set at 1.0/0.5/0.1. The scrub raffinate discharged from the scrubbing stage was not combined with the stream flowing into the extraction stage but separated/recovered. The extraction produced 770 L of the raffinate and 350 L of the extracted organic phase. Each product was analyzed for its chemical composition. The results are given in Table 4.

TABLE 4

| SFI-6R | Pt | Pd | Rh | Ir | Ru | Cu | Se | Pb | Bi | Sb | Te | Sn | Au |
|---|---|---|---|---|---|---|---|---|---|---|---|---|---|
| Organic phase | 0.026 | 6.45 | 0.002 | <0.001 | 0.008 | <0.001 | <0.001 | <0.001 | <0.001 | <0.001 | <0.001 | <0.001 | 0.005 |
| Raffinate | 0.713 | 0.018 | 0.154 | 0.021 | 0.31 | 0.134 | 0.058 | 1.24 | 10.7 | <0.001 | 0.002 | <0.001 | <0.001 |

(Unit: g/L)

As shown in Table 3, the second step concomitantly separated antimony, tellurium, tin and gold as impurity elements.

The organic phase from this step was reduced with an aqueous solution of sodium sulfite following the normal procedure, and the resulting metallic component was reduced and stripped. The regenerated organic phase was reused for the extraction.

(3) Third Step

The third step incorporated 350 L of the raffinate from the second step with 233 L of a 24% by weight aqueous solution of sodium hydroxide to adjust its pH level at 1, and diluted As shown in Table 4, the third step selectively separated palladium. The palladium-containing organic phase was treated with an aqueous solution of ammonia following the normal procedure, and the resulting metallic component was separated by stripping. The regenerated organic phase was reused for the extraction. The stripping liquor containing palladium was neutralized with hydrochloric acid, to recover the diamminepalladium (II) chloride crystal, at a purity of at least 99.9% by weight (as metal).

(4) Fourth Step

The fourth step treated the raffinate from the third step by solvent extraction to remove the anionic impurity elements, where the extractant was bis(2-ethylhexyl)phosphoric acid (Daihachi Chemical Industry, DP-8R) diluted with EM Clean 7250 (Nikko Petrochemicals) to 50% by volume. The extraction was carried out in 2 stages using a cocurrent mixer/settler, where extraction time was set at 0.5 hours for each stage. Each stage was incorporated with a sodium salt of DP-8R to be kept at a pH of 2.7 and 3.5 in the first and second stages, respectively.

The extracted organic phase was scrubbed with 1 mol/L solution of sodium chloride, and then stripped with 2 mols/L hydrochloric acid. The starting solution/DP-8R solution/sodium type DP-8R solution/scrubbing solution of sodium chloride/back-extracting hydrochloric acid ratio was set at 1/0.5/0.2/0.7/0.7. The wash solution discharged from the scrubbing stage was not combined with the stream flowing into the first extraction stage but separated/recovered. The extraction produced 770 L of the raffinate and 539 L of the extracted organic phase. Each product was analyzed for its chemical composition. The results are given in Table 5.

TABLE 5

| Products by extraction with DP-8R | Pt | Pd | Rh | Ir | Ru | Cu | Se | Pb | Bi | Te |
|---|---|---|---|---|---|---|---|---|---|---|
| Organic phase | 0.001 | <0.001 | <0.001 | <0.001 | 0.001 | 0.19 | 0.002 | 1.54 | 15.2 | <0.001 |
| Raffinate | 0.712 | 0.018 | 0.154 | 0.021 | 0.309 | 0.001 | 0.057 | 0.165 | 0.021 | 0.0021 |

(Unit: g/L)

As shown in Table 5, the fourth step selectively separated copper, bismuth and lead, almost totally separating the elements other than the PGM.

(5) Fifth Step

The fifth step treated the raffinate from the fourth step to hydrolyze iridium, ruthenium and rhodium, and thereby to separate them from platinum. The raffinate was heated to 80° C., and adjusted at a pH of 7 with 24% by weight sodium hydroxide and, at the same time, at an ORP of 400 mV with 12% by weight sodium hypochlorite. It was kept at the above pH and ORP levels for 30 minutes, and the resulting precipitate was removed by filtration. The hydrolysis produced 2.5 kg of the precipitate (wet basis) and 801 L of the mother liquor. Each product was analyzed for its chemical composition. The results are given in Table 6.

TABLE 6

| Products by hydrolysis | Unit | Pt | Pd | Rh | Ir | Ru | Cu | Se | Pb | Bi | Te |
|---|---|---|---|---|---|---|---|---|---|---|---|
| Precipitate | % by weight | 7.34 | 0.30 | 3.60 | 0.50 | 7.56 | 0.04 | 0.007 | 4.06 | 0.5 | 0.052 |
| Mother liquor | g/L | 0.319 | 0.004 | 0.006 | <0.001 | 0.002 | <0.001 | 0.044 | <0.001 | <0.001 | <0.001 |

(Unit: g/L)

As shown in Table 6, the fifth step totally precipitated the PGM other than platinum, and separated more than half of platinum by distributing it in the filtrate.

The mother liquor was treated following the normal procedure, where platinum was reduced with hydrazine hydrate, and the reduction product was dissolved in hydrochloric acid in the presence of an oxidant and then incorporated with ammonium chloride, to separate the ammonium hexachloroplatinate (IV) crystal, at a purity of least 99.9% by weight (as metal).

(6) Sixth Step and Ruthenium Refining Step

The sixth step treated the precipitate from the fifth step to leach out ruthenium, where 2146 g (wet basis) of the precipitate was suspended in 24.6 L of a 24% by weight aqueous solution of sodium hydroxide, and the resulting suspension was adjusted at an ORP of 200 mV with 12% by weight hypochlorite. It was heated to 60° C., which decreased its ORP level. Therefore, it was further incorporated with hypochlorite to be kept at an ORP of 200 mV again, at which it was held for 3 hours. Its pH level was 14. The suspension was filtered, to produce 54.2 L of the leach liquor and 2075 g (wet basis) of the leach residue. Each product was analyzed for its chemical composition. The results are given in Table 7.

As shown in Table 8, the ruthenium reduction precipitated 98.4% of ruthenium whereas only 17% of platinum.

Next, the precipitate from the reduction stage was incorporated with 830 mL of a 24% by weight aqueous solution of sodium hydroxide and water, to prepare 1.65 L of the suspension. The suspension was adjusted at an ORP of 100 mV with sodium hypochlorite, and heated to 60° C., which decreased its ORP level. Therefore, it was further incorporated with sodium hypochlorite to be kept at an ORP of 100 mV again, at which it was held for 3 hours. Then, the suspension was filtered, and the resulting residue was washed with water. This produced 2.37 L of the ruthenium compound solution (filtrate and wash water totaled) and a trace quantity of the residue. Each product was analyzed for its chemical composition. The results are given in Table 9.

TABLE 7

| Products by Ru leaching | Unit | Pt | Pd | Rh | Ir | Ru | Cu | Se | Pb | Bi | Te |
|---|---|---|---|---|---|---|---|---|---|---|---|
| leach liquor | g/L | 3.71 | 0.079 | 0.14 | 0.069 | 4.11 | 0.009 | 0.003 | 0.43 | 0.006 | 0.030 |
| Residue | % by weight | 1.36 | 0.24 | 5.06 | 0.57 | 0.65 | 0.032 | 0.002 | 4.99 | 0.78 | <0.001 |

As shown in Table 7, the sixth step leached out 94.3% of ruthenium.

The leach liquor was treated to refine ruthenium.

First, 54.2 L of the leach liquor was incorporated with 41 mL of methanol to reduce ruthenium (VI), which decreased its ORP level from 119 to −63 mV. The resulting slurry was filtered, to produce 843.9 g (wet basis) of the precipitate containing ruthenium hydroxide as the major component and 54.2 L of the mother liquor. Each product was analyzed for its chemical composition. The results are given in Table 8.

TABLE 9

| Products by Ru re-leaching | Unit | Pt | Rh | Ir | Ru | Cu | Pb | Bi |
|---|---|---|---|---|---|---|---|---|
| Re-leach liquor | g/L | 0.35 | 0.085 | 0.024 | 72.4 | 0.003 | 0.049 | 0.057 |
| Residue | % by weight | 0.76 | 1.276 | 0.636 | 14.0 | 0.13 | 6.69 | 0.057 |

Next, the re-leach liquor was incorporated with 23 mL of methanol, which decreased its ORP level from 80 to −54

TABLE 8

| Products by Ru reduction | Unit | Pt | Pd | Rh | Ir | Ru | Cu | Se | Pb | Bi | Te |
|---|---|---|---|---|---|---|---|---|---|---|---|
| Precipitate | % by weight | 0.40 | <0.001 | 0.54 | 0.264 | 25.9 | 0.054 | <0.001 | 2.72 | 0.039 | <0.001 |
| Mother liquor | % by weight | 3.65 | 0.079 | 0.057 | 0.028 | 0.066 | <0.001 | 0.003 | 0.004 | <0.001 | 0.030 | mV. The resulting suspension was filtered, and the resulting residue was washed with water. This produced 2.37 L of the mother liquor and 722.3 g (wet basis) of rereduced ruthenium (IV) hydroxide. Each product was analyzed for its chemical composition. The results are given in Table 10.

TABLE 10

| Products by Ru rereduction | Unit | Pt | Rh | Ir | Ru | Cu | Pb | Bi |
|---|---|---|---|---|---|---|---|---|
| Rereduced product | % by weight | 0.002 | 0.017 | 0.005 | 23.33 | <0.001 | 0.016 | 0.019 |
| Mother liquor | g/L | | 0.347 | 0.034 | 0.01 | 1.158 | <0.001 | <0.001 | <0.001 |

Next, 722.3 g (wet basis) of rereduced ruthenium (IV) hydroxide was dissolved in 2 L of hydrochloric acid, and heated at 90° C. for 3 hours. The resulting solution was incorporated with 250 g of potassium chloride, and the potassium tetrachlorooxoruthenate (IV) crystal separated out was recovered by filtration. This produced the crystal and mother liquor. Each product was analyzed for its chemical composition. The results are given in Table 11.

As shown in Table 12, the seventh step produced the iridium stripping liquor containing iridium, platinum and ruthenium, and rhodium concentrate as the raffinate in which rhodium was distributed.

The iridium stripping liquor was treated to separate/refine iridium.

TABLE 11

| Products by Ru crystallization | Unit | Pt | Pd | Rh | Ir | Ru | Cu | Se | Pb | Bi | Te | Fe | As |
|---|---|---|---|---|---|---|---|---|---|---|---|---|---|
| Crystal | ppm | <20 | <10 | <10 | <10 | 25.1* | <10 | <20 | <20 | <20 | <10 | <10 | <10 |
| Crystal mother liquor | g/L | <0.001 | <0.001 | 0.04 | 0.012 | 0.058 | 0.002 | <0.001 | 0.039 | 0.046 | <0.001 | <0.001 | <0.001 |

(* Unit: % by weight)

As shown in Table 11, the ruthenium compound at a purity of least 99.9% by weight was produced.

(7) Seventh Step and Iridium Refining Step

The seventh step first treated the leaching residue from the sixth step to separate iridium and rhodium mutually, where 2075 g (wet basis) of the leaching residue was dissolved in 3.1 L of hydrochloric acid, incorporated with 160 mL of nitric acid to accelerate formation of the chloro complex, and heated at 90° C. for 3 hours, to produce 3.53 L of the solution containing iridium and rhodium. It was analyzed for its chemical composition. The results are given in Table 12.

The solution as the stating solution was treated by solvent extraction to extract iridium using a multi-stage, countercurrent mixer/settler performing extraction in 3 stages and scrubbing in 2 stages, where tributyl phosphate (Daihachi Chemical Industry, TBP) was used as the extractant and 4 mols/L hydrochloric acid for scrubbing. The starting solution/TBP/scrubbing hydrochloric acid ratio was set at 1/1/0.5. The wash solution discharged from the scrubbing stage was combined with the stream flowing into the first extraction stage. The starting solution had an ORP of 950 mV.

The scrubbed extractant was brought into contact with a 4% by weight aqueous solution of sodium chloride of the same volume countercurrently in 2 stages for stripping, where mixing time and phase separation time were set at 10 and 20 minutes, respectively, for each stage. The extraction produced 5.29 L of the raffinate and 3.53 L of the iridium stripping liquor. Each product was analyzed for its chemical composition. The results are given in Table 12.

TABLE 12

| Feed for and products by Ir/Rh separation | Pt | Rh | Ir | Ru |
|---|---|---|---|---|
| Starting solution | 7.99 | 29.74 | 3.33 | 3.81 |
| Raffinate | 0.01 | 19.7 | 0.12 | 0.97 |
| Stripping liquor | 7.98 | 0.15 | 3.15 | 2.36 |

(Unit: g/L)

First, the iridium stripping liquor was incorporated with 0.6 L of hydrochloric acid and 350 g of metallic bismuth granules, heated to 90° C., and stirred until solution ORP reached the lowest level (300 mV). Then, the alloy particles reduced by bismuth was filtered together with residual metallic bismuth. This bismuth reduction produced 61.3 g (wet basis) of the precipitate and 4.14 L of the filtrate. Each product was analyzed for its chemical composition. The results are given in Table 13.

TABLE 13

| Bi reduction products | Unit | Pt | Rh | Ir | Ru |
|---|---|---|---|---|---|
| Precipitate | % by weight | 45.91 | 0.855 | 0.38 | 12.66 |
| Filtrate | g/L | <0.001 | <0.001 | 2.63 | 0.13 |

(Unit: g/L)

Next, the filtrate (bismuth reduction liquor) was oxidized with sodium hypochlorite to an ORP level of 900 mV, and then incorporated with 360 g of ammonium chloride. The ammonium hexachloroiridate (IV) crystal, which separated out, was separated by filtration. This produced 30.9 g of the crystal and 4.1 L of the filtrate. The iridium compound crystal thus produced was analyzed for its chemical composition. The results are given in Table 14.

TABLE 14

| | Pt | Pd | Rh | Ir | Ru | Cu | Se | Pb | Bi | Te | Fe | As |
|---|---|---|---|---|---|---|---|---|---|---|---|---|
| Ir compound crystal | <10 | <10 | <10 | 34.9* | 360 | <10 | <10 | 250 | <20 | <10 | <10 | <50 |

TABLE 14-continued

| | Pt | Pd | Rh | Ir | Ru | Cu | Se | Pb | Bi | Te | Fe | As |
|---|---|---|---|---|---|---|---|---|---|---|---|---|
| Ir-containing crystal produced by recrystallization | <10 | <10 | <10 | 35.1* | <10 | <10 | <10 | <10 | <20 | <10 | <10 | <50 |

(Unit: ppm, Unit for Ir(*) is % by weight)

As shown in Table 14, the iridium compound crystal produced in this stage could not be purified to 99.9% by weight or more (as metal), because of presence of ruthenium and lead as contaminants. Therefore, it was further refined by recrystallization. The crystal was suspended in 550 mL of 1 mol/L hydrochloric acid, and incorporated with hydrazine hydrate to decrease its ORP level to 500 mV and dissolved in the acid. It was then recrystallized in the presence of sodium hypochlorite, which increased its ORP level to 900 mV. This separated out 30.6 g (wet basis) of the iridium-containing crystal. It was analyzed for its chemical composition. The results are also given in Table 14.

As shown in Table 14, the recrystallization increased purity of the iridium-containing crystal to 99.9% by weight or more (as metal).

As described above, the process of the present invention for mutual separation of PGM is suitable for treating concentrates or the like containing PGM and impurity elements, e.g., byproducts from refining of nonferrous metals (e.g., copper, nickel and cobalt) and various spent catalysts (e.g., those for treating automobile exhaust gases) to separate the PGM mutually while removing the impurity elements.

What is claimed is:

1. A process for mutual separation of platinum group metals (PGM) from a raw material which also contains impurity elements, comprising the following steps:
   (1) first step, wherein the raw material containing PGM is leached in the presence of an oxidant while being suspended in a hydrochloric acid solution to prepare a leach liquor containing the PGM,
   (2) second step, wherein the leach liquor prepared in the first step is separated by solvent extraction with diethylene glycol dibutyl ether into the organic phase containing impurity elements and a raffinate,
   (3) third step, wherein the raffinate prepared in the second step is treated by solvent extraction with an alkyl sulfide to extract palladium and the resulting loaded solvent is then treated by stripping, to prepare a stripping liquor containing palladium and raffinate,
   (4) fourth step, wherein the raffinate prepared in the third step is separated by solvent extraction with bis(2-ethylhexyl)phosphoric acid into the organic phase containing cationic impurity elements and raffinate,
   (5) fifth step, wherein the raffinate prepared in the fourth step is hydrolyzed in the presence of an oxidant, after being adjusted at a pH of 5 to 12, to prepare a precipitate containing iridium, ruthenium and rhodium, and aqueous solution containing platinum,
   (6) sixth step, wherein the precipitate prepared in the fifth step is leached in the presence of an oxidant in a strongly alkaline aqueous solution kept at a pH of 12 or more, to prepare a residue containing iridium and rhodium, and leach liquor containing ruthenium, and
   (7) seventh step, wherein the residue prepared in the sixth step is dissolved in a hydrochloric acid solution to prepare an aqueous solution containing iridium and rhodium, the aqueous solution is treated by solvent extraction with tributyl phosphate to extract iridium, and the resulting loaded solvent is then treated by stripping, to prepare a stripping liquor containing iridium and raffinate containing rhodium.

2. The process according to claim 1 for mutual separation of PGM, wherein the oxidant for the first step is at least one selected from the group consisting of nitric acid, hydrogen peroxide and chlorine.

3. The process according to claim 1 for mutual separation of PGM, wherein the leach liquor for the second step contains hydrochloric acid at 4 to 9 mols/L.

4. The process according to claim 1 for mutual separation of PGM, wherein each of the impurity elements in the organic phase of the second step is at least one selected from the group consisting of an element which can form a lipophilic chlorocomplex, trivalent arsenic, tetravalent selenium, and tetravalent tellurium.

5. The process according to claim 1 for mutual separation of PGM, wherein the alkyl sulfide for the third step is selected from the group consisting of dihexyl and dioctyl sulfide.

6. The process according to claim 1 for mutual separation of PGM, wherein the raffinate prepared in the second step for the third step is adjusted at a pH of 0.5 to 2.5 before being treated with the alkyl sulfide.

7. The process according to claim 1 for mutual separation of PGM, wherein the fourth step is carried out at a pH of 2.5 to 4.5.

8. The process according to claim 7 for mutual separation of PGM, wherein an alkali metal salt of bis(2-ethylhexyl) phosphoric acid is used as a pH adjusting agent.

9. The process according to claim 1 for mutual separation of PGM, wherein the fifth step is carried out at a temperature 60 to 100° C.

10. The process according to claim 1 for mutual separation of PGM, wherein the fifth step is carried out at an oxidation-reduction potential of 100 to 700 mV, determined using a silver/silver chloride reference electrode.

11. The process according to claim 1 for mutual separation of PGM, wherein the sixth step is carried out at an oxidation-reduction potential of 100 to 300 mV, determined using a silver/silver chloride reference electrode.

12. The process according to claim 1 for mutual separation of PGM, wherein the hydrochloric acid solution for the seventh step contains hydrochloric acid at 3 to 7 mols/L.

13. The process according to claim 1 for mutual separation of PGM, wherein the aqueous solution containing iridium and rhodium is kept at an oxidation-reduction potential of 700 to 1200 mV, determined using a silver/silver chloride reference electrode, for the solvent extraction in the seventh step.

14. The process according to claim 1 for mutual separation of PGM, wherein the aqueous solution for the stripping in the seventh step contains an alkali metal salt.

15. The process according to claim 1 for mutual separation of PGM, wherein a ruthenium refining step is further included to treat the leach liquor containing ruthenium from the sixth step in two stages a reduction stage in the presence of a reductant to prepare the ruthenium containing precipitate and a crystallization stage to prepare the ruthenium compound crystal by dissolving the precipitate.

16. The process according to claim 15 for mutual separation of PGM, wherein the crystallization stage incorporates an aqueous solution of the ruthenium-containing precipitate dissolved in hydrochloric acid with potassium chloride or ammonium chloride to prepare the ruthenium compound crystal.

17. The process according to claim 1 for a mutual separation of PGM, wherein an iridium refining step is further included to treat the stripping liquor from the seventh step in two stages, athe reduction stage in the presence of metallic bismuth to prepare an alloy containing PGM other than iridium and an aqueous solution containing iridium and a crystallization stage to prepare an iridium containing crystal from the aqueous solution.

18. The process according to claim 17 for mutual separation of PGM, wherein the crystallization stage incorporates the iridium-containing aqueous solution, oxidized beforehand in the presence of an oxidant, with potassium chloride or ammonium chloride to prepare the iridium-containing crystal.

* * * * *